(No Model.) 3 Sheets—Sheet 1.

G. W. McKIM & A. R. WILSON.
GLASS POLISHING MACHINE.

No. 546,025. Patented Sept. 10, 1895.

WITNESSES:
A. E. Dieterich
J. N. Bradley

INVENTORS:
George W. McKim
Amos R. Wilson (No Model.) 3 Sheets—Sheet 2.

G. W. McKIM & A. R. WILSON.
GLASS POLISHING MACHINE.

No. 546,025. Patented Sept. 10, 1895.

WITNESSES:
A. E. Dieterich
J. N. Bradley

INVENTORS:
George W. McKim
Amos R. Wilson (No Model.) 3 Sheets—Sheet 3.
G. W. McKIM & A. R. WILSON.
GLASS POLISHING MACHINE.
No. 546,025. Patented Sept. 10, 1895.
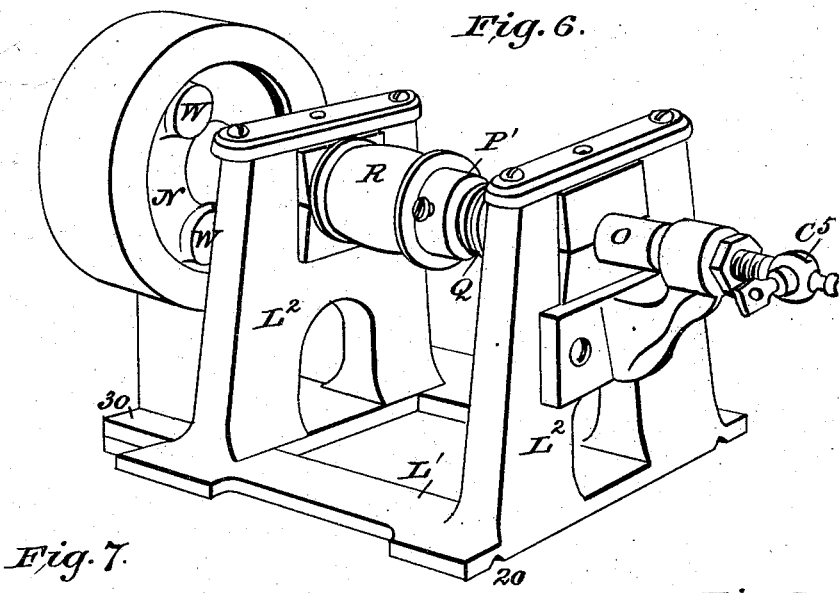
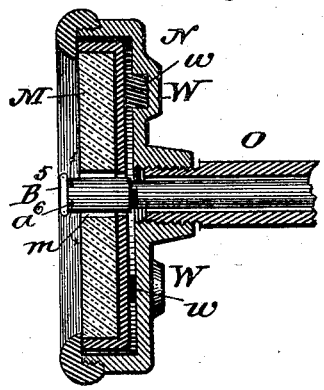
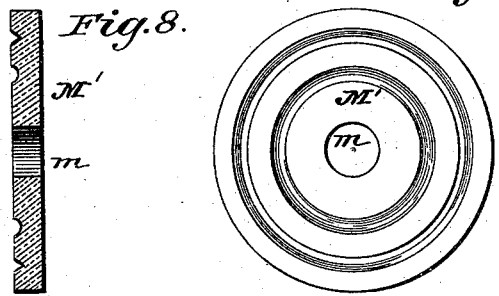
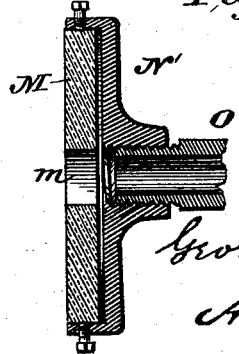
WITNESSES:
A. E. Dieterich.
J. N. Bradley
INVENTORS:
George W. McKim
Amos R. Wilson

UNITED STATES PATENT OFFICE.

GEORGE W. McKIM AND AMOS R. WILSON, OF MARTIN'S FERRY, OHIO, ASSIGNORS OF ONE-THIRD TO MARTIN HUONKER, OF SAME PLACE.

GLASS-POLISHING MACHINE.

SPECIFICATION forming part of Letters Patent No. 546,025, dated September 10, 1895.

Application filed March 28, 1894. Serial No. 505,484. (No model.)

*To all whom it may concern:*

Be it known that we, GEORGE W. McKIM and AMOS R. WILSON, of Martin's Ferry, in the county of Belmont and State of Ohio, have invented a new and Improved Glass-Polishing Machine, of which the following is a specification.

Our invention relates to the manufacture of tumblers and other glassware, and it more especially refers to means for grinding and smoothing the edges of the tumblers after they are cut.

Our invention has, therefore, primarily for its object to provide means whereby the grinding and polishing operation can be accomplished in an accurate, positive, and uniform manner.

Our invention also has for its object to provide a grinding and polishing means in which the stone, while operated to rotate transversely to the pressure direction thereof against the glass, will automatically adapt itself to all irregularities of the cut edge and to constantly and uniformly engage such edge under all conditions.

Our invention also has for its object to provide means for feeding water through the stone-carrying mandrel and discharging it within the tumbler onto the grinding-face of the stone in a positive and uniform manner.

With other minor objects in view, which hereinafter will be referred to, our invention consists in the peculiar arrangement of parts first described in detail and then particularly pointed out in the appended claims, reference being had to the accompanying drawings, in which—

Figure 1:
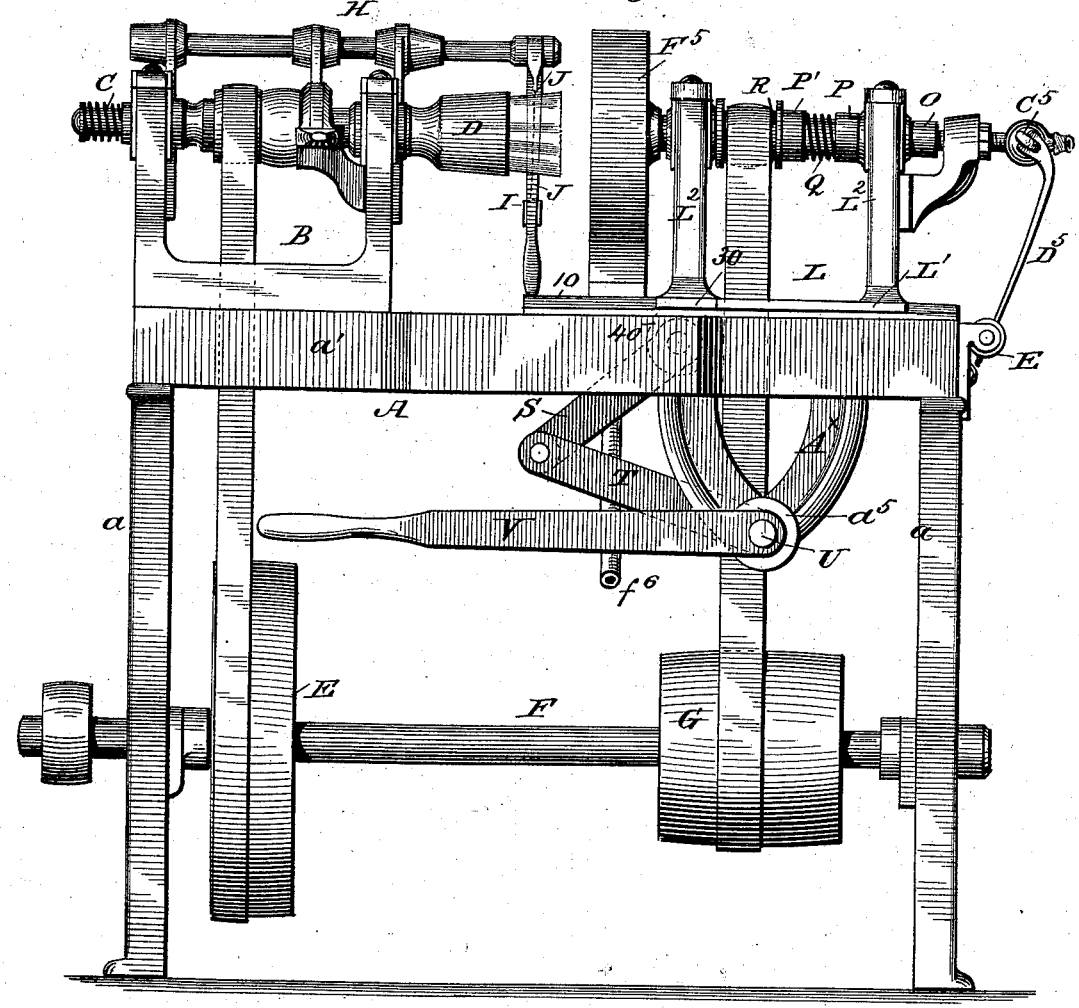
Figure 2:
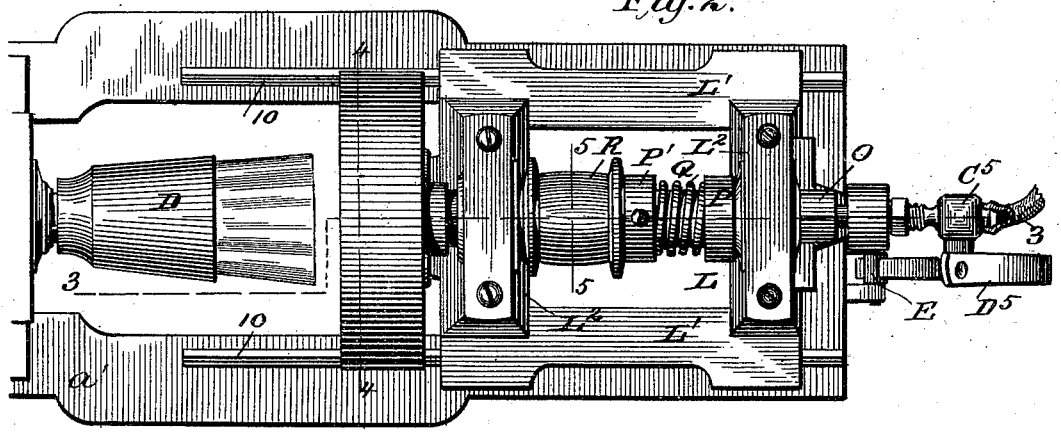
Figure 3:
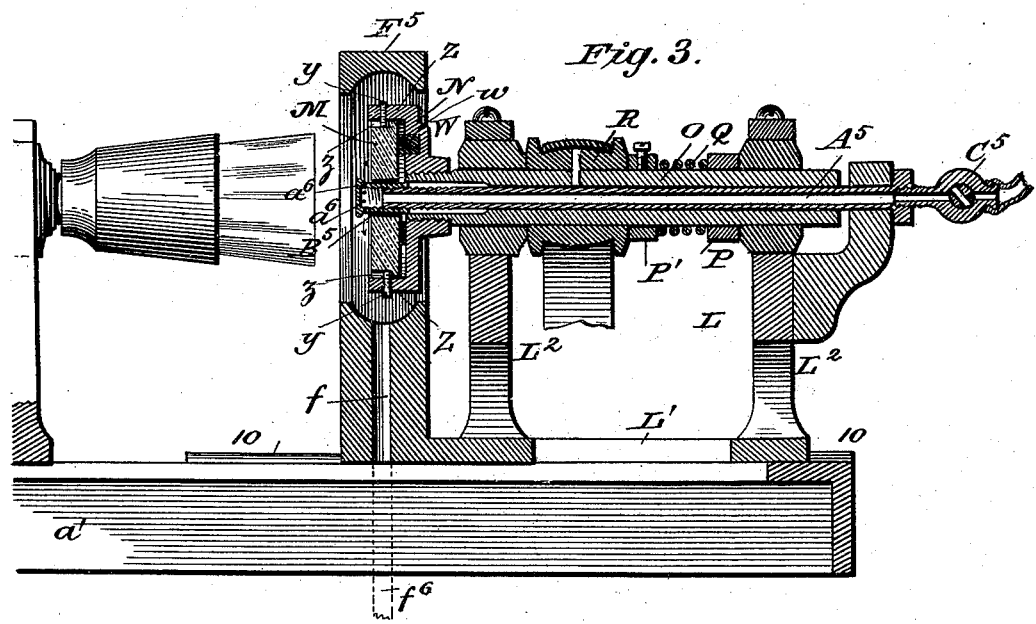
Figures 4, 5:
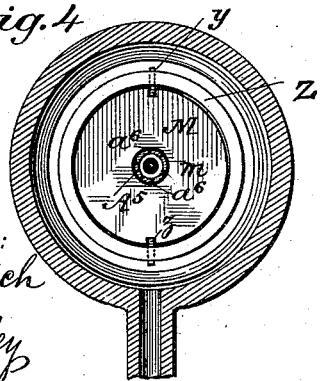

Figure 1 is a side elevation of our improved glass-polishing mechanism constructed and arranged as a part of a combined cutting and polishing machine. Fig. 2 is a plan view of our improved polishing and grinding machine. Fig. 3 is a longitudinal section of the same on the line 3 3, Fig. 2. Fig. 4 is a transverse section of the same, taken on the line 4 4, Fig. 2. Fig. 5 is a similar view taken on the line 5 5, Fig. 2. Fig. 6 is a perspective view of the grinding or polishing mechanism proper detached. Fig. 7 is a detail view of one of the grinding-stones detached. Fig. 8 is a similar view of a modified form of stone. Fig. 9 is a cross-section of the stone shown in Fig. 8. Fig. 10 is a sectional view showing a modified manner of holding the stone in the chuck.

While we have shown our improved grinding and polishing means constructed for use in connection with suitably-arranged cutting devices, and while we so prefer to contruct it, as by so doing we make practically a combined cutting and polishing machine, yet we desire it understood that the same may be used in connection with any suitably-arranged devices for holding the glass-body while the grinding-wheel is held in engagement therewith.

Referring now to the accompanying drawings by letters and numerals, A indicates a supporting-frame, in practice preferably of the construction shown in Fig. 1, and which substantially comprises the supporting-legs $a$ $a$ and the bed portion $a'$. On such bed portion, at one end, is fixedly held a supporting frame or housing B, in which is journaled a mandrel C, which has detachably connected therewith at one end a chuck D, and has centrally a fast and loose drive-pulley, which are adapted to be alternately set in connection with a main drive-pulley E on a main drive-shaft F, which has also a drive-pulley G for a purpose presently explained. On the housing B is also mounted a shaft H, which has pivotally connected therewith at one end a cutter-frame I, equipped with the usual friction cutter or wire J.

The construction and arrangement of parts so far as described, are *per se* not new, they being the ordinary arrangement of cutting devices now in common use and for such devices we therefore make no claim. We would state, however, that in practice a large number of chucks are usually provided for each cutting-machine, which are adapted to be detachably fitted on the mandrel and are adapted to clamp the various sizes and shapes of ware.

When our improved polishing and grinding devices are built in connection with a cutting-machine, as shown in Fig. 1, the bed portion has at one end longitudinal rails or guides 10 10, on which is held to slide a carriage or frame L, which carries the grinding devices, and which has a base member L' formed with undercut grooves 20 20, which fit on the said rails 10, as most clearly shown in Fig. 1. It will be noticed by reference to Fig. 2 that the grinding-stone is arranged to rotate at right angles to the face of the glass-holding chuck D, and the shaft which carries such stone is arranged in the same longitudinal plane and in line with the glass-chuck-holding mandrel, whereby the center or axis of the stone will be in line with the center of the chuck D.

The grinding-stones M, which in practice are of different diameters and thicknesses to suit different grades of works, are held in chucks N, adapted to be detachably connected to the threaded outer end of the mandrel O. This mandrel, it will be noticed, is journaled in vertical standards $L^2$, projected up from the base L', and such mandrel is held for a limited longitudinal movement in such bearings and is normally held up to its outermost position by spring pressure for a purpose which is best explained as follows: After the ware is cut the edge frequently is left very rough and sometimes with jogs or irregular edges. It is therefore necessary that the stone yield or automatically adjust itself to accommodate itself to the inequalities of the edge in such a manner that it be so sensitive in its bearing on the ware that a true and accurate finish be attained. For such purposes we arrange the carriage or frame L longitudinally movable, as most clearly shown in Fig. 2, and provide the shaft O with a loose collar P, held against the rear standard $L^2$, and a collar P', adjustably held on such shaft, and between such collars and disposed on the shaft is a stout spiral spring Q, which normally forces the mandrel O forward in the direction of the glass-holding chuck. By making the collar P' adjustable the tension of the spring can be readily regulated.

R indicates a drive-pulley keyed on the mandrel O and belted with the drive-pulley G on the main drive-shaft and from which it receives a continuous rotation.

The front end of the carriage L has an extension 30, which has a pendent apertured ear 40, to which is pivotally connected one end of a toggle-arm S, the other end of which pivotally connects with a crank-arm T, having a spindle U held to rock in a bearing $a^5$ in a bracket $A^\times$ on the main frame, such spindle having an operating-handle V, as shown.

For ordinary work the stone M is fixedly held in a chuck in any approved manner—for example, as shown in the modification illustrated by Fig. 10, in which a chuck N', having its annular rim provided with binding or holding screws for securing the stone to the chuck is provided, and in such case the longitudinally-yielding movement will be all that is necessary to render the stone capable of grinding the face of the ware as desired. For finer kinds of ware, however, we prefer to seat the stone in a chuck having a supplemental yielding movement both longitudinally and laterally, whereby it will have approximately a universal or rocking movement, such as is capable of being attained by the hand manipulation. For such purpose the chucks are specially constructed with a number of pockets W or depressions arranged uniformly about the axis of the stone, in which are seated cushion-springs $w$ $w$, of rubber or metal, against which the stone rests, it being held for a limited longitudinal movement in the holding-chuck by the holding-screws $y$, which fit grooves $z$ in the periphery of the supplemental holding-ring Z, as most clearly shown in Fig. 3.

By providing supplemental yielding means for the stone it is manifest that the same will automatically adjust itself to the inequalities or irregularities of the glass edges under all circumstances, even after the full extent of the yielding pressure of the shaft is exceeded. Furthermore, by providing a grinding-wheel held independent of the shaft—i. e., capable (owing to its peculiar connection with its holding-chuck) of rocking in all directions—the same will have an approximately-universal movement relatively to the cut edge of the glass, and thereby automatically adapt itself to bear against the glass with an equalized pressure in any position as effectively and positively as could possibly be accomplished by the hand of a most skillful operator.

The operation of our improved devices so far as described is as follows: After the glass is cut its revolution is immediately stopped by shifting the drive-belt and by the operator grasping the glass body with a damp cloth held in the left hand. After the ware is thus brought to a standstill the operator with his right hand manipulates the lever and brings the carriage with the rapidly revolving stone against the cut edge, the pressure being regulated somewhat by the proper manipulation of the lever, which operation is quickly accomplished, after which the carriage is moved back, another blown or pressed body placed in the chuck and cut, and the carriage with the grinding-wheel is again moved up, as before. As before stated, different thicknesses and diameters of wheels and holding-chucks therefor are used for various kinds of ware, and to provide means whereby the cut edge can be smoothed, flat, round, or beveled such stones may have a flat grinding-face, as shown in Fig. 3, for grinding flat surfaces. For some kinds of work we find it preferable, however, to use the modified form of stones M' shown in Figs. 8 and 9, which stone has one or more concaved or $\Lambda$-shaped annular grooves for forming round or beveled edges, which edges are found most desirable on fine ware, as it removes all traces of the cut on the glass.

Another and very important feature of our invention is the manner in which the stone is kept wet during the grinding operations automatically and in such a manner that its face will have a regular and even supply of water without undue waste and without any special care or attention from the operator. To these ends, the mandrel O, which carries the grinding-stone, is made hollow and the stones made with a central opening $m$. Within the hollow mandrel is a tube $A^5$, the outer end of which has a cap piece $B^5$, closed at the front, but formed just to the rear of the annular rim or cap portion with a series of apertures $a^6$ in the periphery, which preferably incline slightly rearward. This cap portion, it will be noticed by reference to Fig. 3, extends slightly beyond the front face of the stone, so that the water fed to such stop will escape in jets onto the face of such stone, and such tube projects at the rear of the mandrel or shaft O and has a valve $C^5$ and a flexible supply-pipe connected therewith, which in practice is connected to a suitable tank or other water-supply. The valve $C^5$ is normally held to a cut-off position, so that when the stone is not grinding the water-supply is cut off, although if desired such valve may be omitted and a continuous supply provided, as means are also provided for carrying off the waste water, as will presently appear. When the valve is used, it is adapted to be automatically opened as the said carriage is moved up to bring the grinding-wheel in contact with the glass. To this end, such valve $C^5$ has its stem connected with a rocker arm $D^5$, which in turn has a connection with the bed of the machine, preferably with a rocker member $E^5$, as shown. By this arrangement it will be readily seen that when the carriage is to its rearmost position, as in Fig. 1, the valve will be turned to a closed position; but when moved inward to its innermost position the arm $D^5$ will serve to turn such valve to an open position.

We desire it understood that the means for automatically operating the valve may be varied and even dispensed with and an ordinary stop-cock used to regulate the flow of the water without departing from our invention, which, so far as this feature is concerned, embodies an automatic water-supply on the face of the stone within its grinding-edge while such stone is effecting a grinding action.

A housing $F^5$ surrounds the grinding-wheel, and its holding-chuck, which is secured to the base of the carriage, is made trough-like in cross-section and has an outlet $f$ in the bottom, which connects an off-take tube $f^6$, as shown. As grinding-wheels of different thicknesses are used, we arrange the water-feed pipe with an extensible portion, which may be in the nature of a nozzle having a long screw connection with the body of the water-tube, as shown in Fig. 3, or the tube may have a longitudinally-adjustable connection at its rear end with the main supply-tube, such construction being provided to enable the front or spray nozzle to be adjusted to project forward of the different thicknesses of the stones or grinding-wheels.

From the foregoing description, taken in connection with the drawings, it is thought the complete operation of our machine will be readily understood. Among the advantages attained is that automatic means are provided which will quickly and accurately smooth the edges of the glass bodies without the danger of breaking them without removing them from the cutting-machine, which can be so manipulated that one operator can do the cutting and grinding and turn a quantity of work uniformly and accurately finished in a given time far greater than could be accomplished by a large number of skilled operators by the ordinary methods.

Having thus described our invention, what we claim, and desire to secure by Letters Patent, is—

1. In a machine, as described, in combination with the glass holding chuck, of a rotary mandrel having a grinding wheel connected therewith arranged to face the glass body and having a series of yielding bearing faces, whereby it is adapted to yield laterally and longitudinally, relatively to the said mandrel, substantially as shown and described.

2. In a machine for the purpose described, a rotary grinding wheel shaft or mandrel, having a socket like portion at the front end, provided with a series of cushion members, and a grinding wheel held in such socket, and connected thereto to rotate therewith but longitudinally movable therein against the cushions, all substantially as shown and described.

3. In a machine for the purposes described, the combination with the glass holding devices, a carriage movable longitudinally toward the said devices, a mandrel journaled on such carriage, a socket member carried thereby and a grinding wheel held therein for a universal yielding rocking motion, as set forth.

4. In a machine for the purpose described, the combination with the movable carriage, the rotary grinding wheel held on such carriage, a water supply, adapted to lead the water to the front face of the wheel, and cut-off valves in such supply operated by the reverse movements of the carriage, substantially in the manner and for the purpose described.

5. In a machine for the purpose described, the combination with a supporting frame, a hollow mandrel mounted thereon, a grinding wheel having a central aperture held on one end thereof, a water feed pipe held in such pipe, having a detachable discharge nozzle projected through the grinding wheel aperture, and longitudinally adjustable therein, all arranged substantially as shown and described.

6. In a machine for the purposes described, the combination with the main frame, the longitudinally movable carriage having a housing or trough like member at the front end, and the mandrel journaled therein, of the chuck N detachably held on the end of such mandrel the centrally apertured grindstone detachably held on the chuck N, and the water feed pipe projected through the grindstone mandrel and having radially projected perforations in its front end, all arranged substantially as shown and described.

7. The combination of the main frame, the longitudinally movable carriage L, the mandrel, the chuck N detachably held thereon, having yielding bearings or cushions W, the grindstone held against the cushions within the chuck N, and means for preventing the stone moving outward, from the chuck, all substantially as shown and described.

In testimony whereof we affix our signatures in presence of two witnesses.

GEORGE W. McKIM.
AMOS R. WILSON.

Witnesses:
F. R. SEDGWICK,
E. E. McCOMBS.